United States Patent
Wilday

[19]

[11] Patent Number: 6,068,397
[45] Date of Patent: May 30, 2000

[54] FOLDING STAND MIXER ASSEMBLY

[75] Inventor: Ryan L. Wilday, San Jose, Calif.

[73] Assignee: Revél, Inc., Houston, Tex.

[21] Appl. No.: 09/290,813

[22] Filed: Apr. 13, 1999

[51] Int. Cl.$^7$ .................................................. A47J 43/07
[52] U.S. Cl. .......................................... 366/199; 366/200
[58] Field of Search ............................... 366/96–98, 197, 366/199, 200, 201, 207, 344

[56] References Cited

U.S. PATENT DOCUMENTS

| | | |
|---|---|---|
| 1,984,619 | 12/1934 | Wright . |
| 2,032,571 | 3/1936 | Gilbert et al. . |
| 2,086,817 | 7/1937 | Newnham . |
| 2,131,290 | 9/1938 | Kochner et al. . |
| 2,255,478 | 9/1941 | Allenby . |
| 2,317,098 | 4/1943 | Gough . |
| 2,330,860 | 10/1943 | Behar . |
| 2,599,275 | 6/1952 | Nelson . |
| 2,938,715 | 5/1960 | Farrell, Jr. . |
| 2,943,846 | 7/1960 | Lambert . |
| 3,170,674 | 2/1965 | Gomersall et al. . |
| 3,224,743 | 12/1965 | Freedman et al. . |
| 5,533,805 | 7/1996 | Mandel ................................... 366/197 |
| 5,653,536 | 8/1997 | Mandel ................................... 366/197 |
| 5,782,558 | 7/1998 | Roberts .................................. 365/200 |

*Primary Examiner*—Charles E. Cooley
*Attorney, Agent, or Firm*—Russell J. Egan

[57] ABSTRACT

A food mixer assembly having a base, an arm one end of which is pivotally attached to the base, and a head assembly receivable on the free end of the arm. The mixer assembly is stored by removing the head assembly, collapsing the arm into the plane of the base, and placing both the motor and base into a bowl used with the mixer.

6 Claims, 3 Drawing Sheets

FOLDING STAND MIXER ASSEMBLY

BACKGROUND OF THE INVENTION

1. The Field of the Invention

The present invention pertains to a food mixer assembly which can be folded into itself for compact storage.

2. The Prior Art

Food mixers have been a common household kitchen appliance for many years. They have always had a rather bulky appearance with a stand having a base portion and a cantilever arm upon which the mixer motor was mounted. The stand usually included a turn table for a mixing bowl and beaters of many configurations would be inserted into the motor to depend into a bowl placed on the turntable. This common appliance, while very useful in everyday food preparation, was sufficiently heavy that it was usually left out on a counter thereby both taking up usable working surface area and creating an unsightly appearance. This created a sub market of covers to hide the mixer and its stand but did not relieve the problem of space utilization.

An improvement to the old standard mixer came with the advent of smaller motors making portable mixers, and even cordless model portable mixers, possible. While these improvements to mixers did free up counter space, they created their own unique storage problems, particularly the cordless models which require a power source in the storage area to maintain the battery.

The present invention addresses the above noted problems and solves them with a new and novel mixer assembly which can be folded into itself creating a compact storage package.

SUMMARY OF THE INVENTION

The subject food mixer assembly has a base, an arm one end of which is pivotally attached to the base, a head assembly receivable on the free end of the arm, and a bowl used with the subject mixer assembly. The mixer assembly is stored by removing the head assembly and placing it in the bowl, collapsing the arm into the plane of the base, and placing both the arm and base into the bowl. Locking means are provided at both ends of the arm to lock it relative to the base and to secure the head on the free end of the arm.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
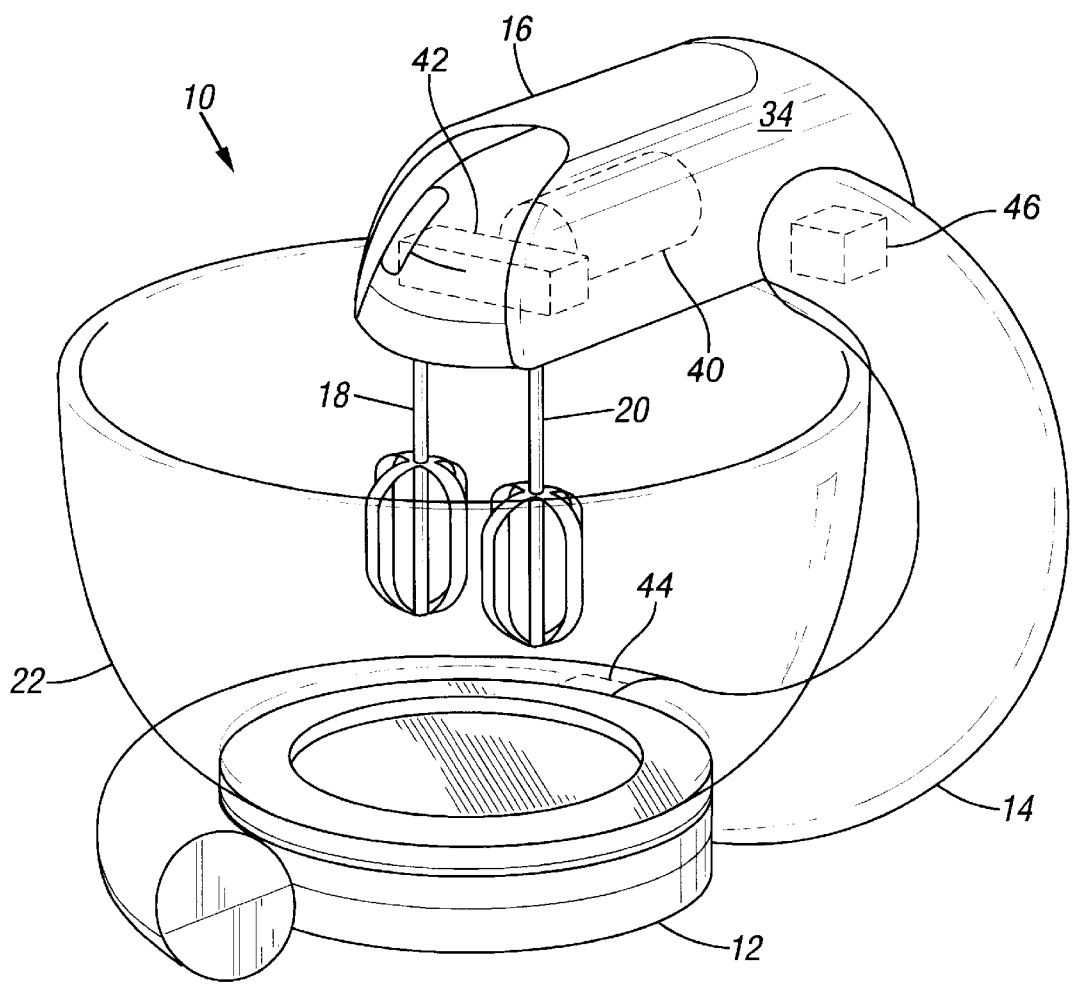
FIG. 1 is a perspective view of the subject mixer in the set up position.
Figure 2:
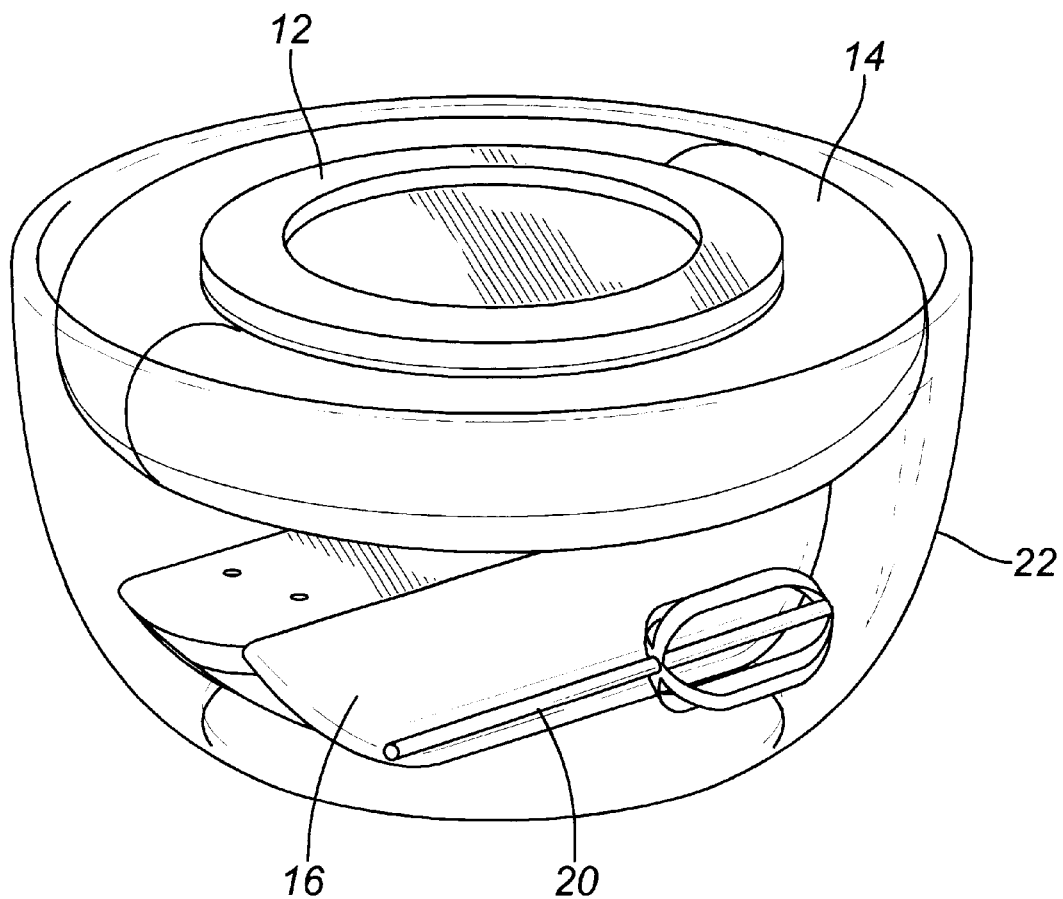
FIG. 2 is a perspective view of the subject mixer in the folded storage position.
Figure 3:
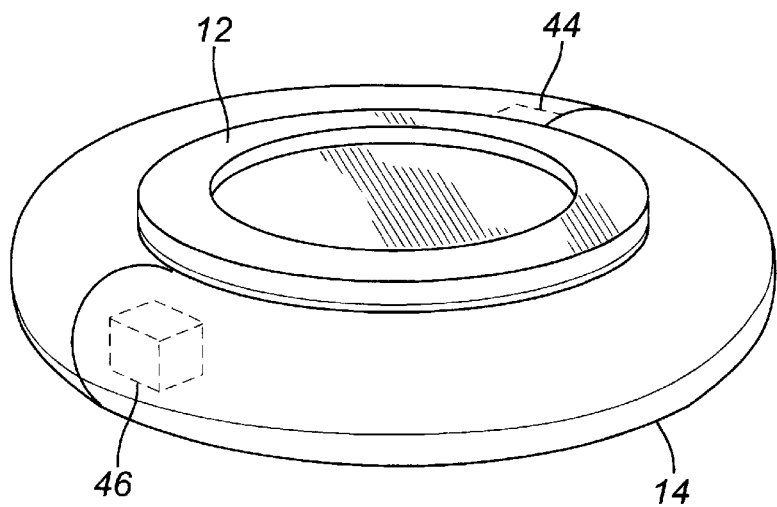
FIG. 3 is a perspective view of only the base and arm portions of the subject invention in the stored position.
Figure 4:
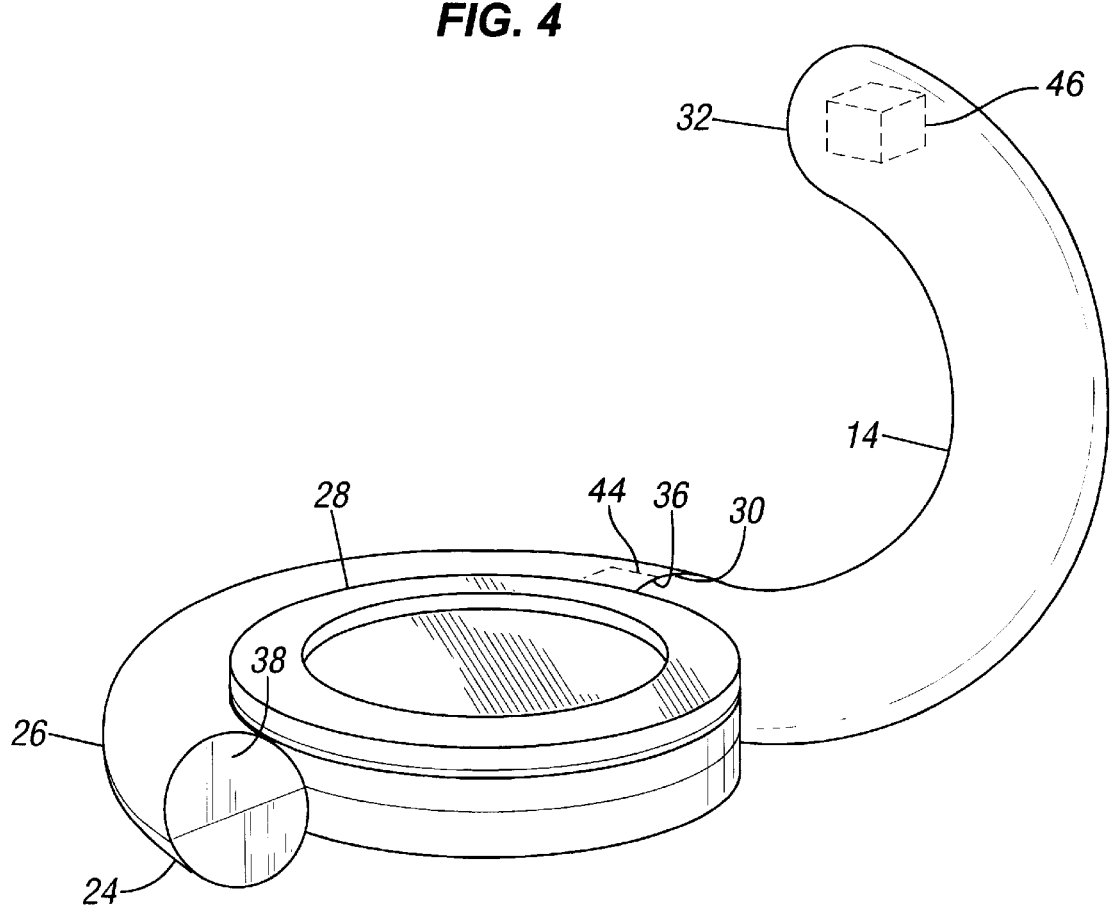
FIG. 4 is a perspective view of only the base and arm portions of the subject invention in the set up or use position.

The subject food mixer assembly 10 has a base 12, an arm 14, a mixer head 16 including removable beaters 18, 20, and a bowl 22. The base 12 is a generally round assembly of two mirror image sections 24, 26, described in greater detail below, receiving a turntable 28 thereon. The arm 14 is an arcuate tubular member pivotally attached by one end 30 to the base along an axis parallel to a tangent of the base, but spaced inwardly a distance one half the diameter of the arm. The arm 14 is rotated about this axis from a first, or folded, position in which its medial plane is aligned with the medial plane of the base 12, to an operating position in which the medial plane of the arm is approximately vertical, normal to the medial plane of the base, where it is locked in place by first locking means 44 mounted within the base 12. The free end 32 of the arm 14 is profiled to receive thereon the mixer head 16 to extend over the base 12 in cantilever fashion. Second locking means 46 secure the mixer head 16 to the free end 32 of arm 14 in such fashion as to allow rotation in a vertical plane about the end 32 of the arm 14. The mixer head 16 is made up of a housing 34 defining a closed cavity in which are mounted a motor 40 attached to beater drive means 42 and the above mentioned mounting means (also not shown) engaging the free end 32 of the arm 14 so that the mixer head 16 extends substantially radially to overlie the approximate center of the base 12 and the turntable 28 mounted thereon. Also not shown are the known means for securing the beaters 18, 20 in the drive means and for removing them therefrom.

The base 12 has, in top plan view, a generally circular profile formed by first and second opposed concentric semi circles having a common axis, but different radii, and each providing half of the base. The radius of smaller portion is shorter than the radius of the larger portion by a distance equal to the thickness of the arm. This forms two steps 36, 38 located 180° apart on opposite sides of the base 12 with each step having a width equal to that of the arm 14. One end 30 of the arm 14 is pivotally attached to the base 12, at step 36, by a pin (not shown) extending substantially parallel to a tangent of the base 12 and intermediate the step 36. The arm 14, in the folded position, completes the larger circumference of the base 12. The base 12 has thickness and weight sufficient to provide stability for the mixer during operation.

Conventional beaters have been shown. However, the present invention is not at all limited to the beaters shown. Any conventional beater, such as dough beaters (not shown) may be used with the present invention.

The bowl 22 is preferably of at least twelve cup capacity in order to provide adequate storage space for the remainder of the invention. The bowl may be formed of tough plastics material, preferred for the rest of the invention, or glass.

The present invention may be subject to many modifications and changes without departing from the spirit of essential characteristics of the present invention. Therefore, the foregoing description should be considered in all respects as being illustrative and not restrictive of the scope of the invention as defined by the appended claims.

I claim:

1. A folding food mixer assembly comprising:

a base;

mixer head having a housing enclosing a motor and means to drive beaters attached thereto to be driven by said motor;

an arm, one free end of which is pivotally attached to said base and the other end of which is adapted to receive thereon said mixer head in cantilever fashion to extend over said base wherein said base and said arm together, in a folded position, form a short cylinder.

2. A folding food mixer according to claim 1 wherein said arm is pivotally attached to said base along an axis tangential to the outer periphery of said base but spaced inwardly half the diameter of said arm.

3. A folding food mixer according to claim 1 further comprising:

first locking means between said base and said arm for locking said arm in a vertical position.

4. A folding food mixer according to claim 3 further comprising:

second locking means for securing said head on the free end of said arm.

5. A folding food mixer according to claim 1 wherein the outer circumference of said base and arm is receivable within the opening of a bowl of approximately twelve cup capacity.

6. A method for storing a food mixer assembly comprising the steps of:

providing a base;

providing a mixer head having a housing enclosing a motor and means to drive beaters attached thereto to be driven by said motor;

providing an arm, one free end of which is pivotally attached to said base and the other end of which is adapted to receive thereon said mixer head in cantilever fashion to extend over said base;

dismounting the head from the free end of said arm and placing said head in a bowl;

folding said arm to lie in the plane of said base completing the circumference thereof; and placing the folded arm and the base into said bowl.

* * * * *